United States Patent
Pearce et al.

(10) Patent No.: US 11,934,436 B2
(45) Date of Patent: *Mar. 19, 2024

(54) COMPUTER-IMPLEMENTED SYSTEMS AND METHODS FOR INTELLIGENTLY RETRIEVING, ANALYZING, AND SYNTHESIZING DATA FROM DATABASES

(71) Applicant: Nasdaq, Inc., New York, NY (US)

(72) Inventors: Henry Pearce, London (GB); James Tickner, London (GB)

(73) Assignee: Nasdaq, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/127,096

(22) Filed: Mar. 28, 2023

(65) Prior Publication Data

US 2023/0229684 A1    Jul. 20, 2023

Related U.S. Application Data

(63) Continuation of application No. 17/354,043, filed on Jun. 22, 2021, now Pat. No. 11,636,141, which is a
(Continued)

(51) Int. Cl.
*G06F 16/335* (2019.01)
*G06F 16/33* (2019.01)
(Continued)

(52) U.S. Cl.
CPC ........ *G06F 16/337* (2019.01); *G06F 16/334* (2019.01); *G06F 16/355* (2019.01); *G06Q 40/06* (2013.01)

(58) Field of Classification Search
CPC .... G06F 16/337; G06F 16/334; G06F 16/355; G06Q 40/06
See application file for complete search history.

(56) References Cited

U.S. PATENT DOCUMENTS 6,847,944 B1    1/2005  Tosh et al.
7,181,406 B1    2/2007  Modest
(Continued)

OTHER PUBLICATIONS

U.S. Appl. No. 13/345,207, filed Jan. 6, 2012, Inventor: Lindauer et al.
(Continued)

*Primary Examiner* — Kris E Mackes
*Assistant Examiner* — Lin Lin M Htay
(74) *Attorney, Agent, or Firm* — NIXON & VANDERHYE P.C.

(57) ABSTRACT

A computer extracts from contact records that each include a contact identifier, a group identifier for each group with which the contact has had an interaction, and interaction information that indicates a number of interactions and a timing of a most recent interaction. The contact data records are processed to generate a contact profile record for each contact including group metric values and a corresponding value for each group metric value based on an interaction history of groups the contact has interacted with. An interaction analytics databases stores a set of contact profile records and group profile records for groups that include metric values associated with the group and an interaction history. They are processed with at least thousands of the contact profile records to determine group-contact compatibility factors. A compatibility parameter is generated and communicated for each of at least thousands of contacts based on the group-contact compatibility parameters.

19 Claims, 12 Drawing Sheets

Related U.S. Application Data continuation of application No. 15/234,311, filed on Aug. 11, 2016, now Pat. No. 11,048,739.

(60) Provisional application No. 62/205,115, filed on Aug. 14, 2015.

(51) Int. Cl.
  *G06F 16/35* (2019.01)
  *G06Q 40/06* (2012.01)

(56) References Cited

U.S. PATENT DOCUMENTS

| | | |
|---|---|---|
| 11,048,739 B2 | 6/2021 | Pearce et al. |
| 2002/0087450 A1 | 7/2002 | Reddy |
| 2005/0288954 A1 | 12/2005 | McCarthy |
| 2007/0100724 A1 | 5/2007 | Hollas et al. |
| 2007/0294154 A1 | 12/2007 | Henninger |
| 2008/0162372 A1 | 7/2008 | Margolis et al. |
| 2009/0248497 A1 | 10/2009 | Hueter |
| 2013/0080641 A1 | 3/2013 | Lui |
| 2013/0179259 A1 | 7/2013 | Lindauer et al. |
| 2013/0226616 A1 | 8/2013 | Nigam |
| 2014/0040162 A1 | 2/2014 | McConnell |
| 2014/0040368 A1 | 2/2014 | Janssens |
| 2014/0279720 A1 | 9/2014 | Bhatia |
| 2016/0019552 A1 | 1/2016 | Trivedi |

OTHER PUBLICATIONS

U.S. Appl. No. 17/354,043, filed Jun. 22, 2021, Inventor: Pearce et al.
Final Office Action dated Jul. 10, 2015 in co-pending U.S. Appl. No. 13/345,207, 9 pages.
Office Action dated Oct. 10, 2014 in co-pending U.S. Appl. No. 13/345,207, 26 pages.
Final Office Action dated Dec. 20, 2013 in co-pending U.S. Appl. No. 13/345,207, 20.
Office Action dated Oct. 4, 2012 in co-pending U.S. Appl. No. 13/345,207, 23 pages.
Examiner's Answer dated Jun. 17, 2016 in co-pending U.S. Appl. No. 13/345,207, 9 pages.
Decision on Appeal mailed Mar. 13, 2018 in co-pending U.S. Appl. No. 13/345,207, 12 pages.
Nasdaq OMX Group Inc., "Why Target When you Can QTarget?" Jun. 2011, 2 pages.
Thomson Reuters Smart Targets, Apply Science to Understand Investors, Nov. 29, 2011, 7 pages.
IPREO KKR, Investor Targeting, Nov. 29, 2011, 10 pages.
Final Office Action dated May 13, 2020 for U.S. Appl. No. 15/234,311, 22 pages.
Office Action dated Nov. 1, 2019 for U.S. Appl. No. 15/234,311, 17 pages.
Final Office Action dated Apr. 19, 2019 for U.S. Appl. No. 15/234,311, 25 pages.
Office Action dated Sep. 24, 2018 for U.S. Appl. No. 15/234,311, 26 pages.

Interaction Data Aggregation Example

| Company Identifier | Interaction Name | Interaction Type | Date | Investment Manager Contact Identifier | Investment Manager Contact Job Function | Attendance Flag | Investment Manager Identifier | Investment Manager Style |
|---|---|---|---|---|---|---|---|---|
| 4616 | Q2 2013- Investors lunch | Group Meeting | 7/25/2013 0:30 | 86390 | Chief Investment Officer | Attended | FIRM0001 | Value |
| 4616 | 2014 Earnings Presentation | Analyst Meeting | 2/5/2015 10:30 | 86390 | Chief Investment Officer | Attended | FIRM0002 | Income |
| 12412 | Roadshow | Roadshow | 2/24/2015 12:00 | 655327 | Security Analyst | Attended | FIRM0003 | Hedge Fund |
| 5349 | Roadshow Asia-One-on-One Meeting | One-on-One Meeting | 2/19/2014 12:30 | 682998 | Security Analyst | Attended | FIRM0004 | Core Growth |

Convert tabular, parsed raw data into a condensed, aggregated interaction matrix data structure

Investment Manager Contact Identifiers

| Company Identifier | 86390 | 655327 | 682998 | ... |
|---|---|---|---|---|
| | (No. of Interaction, Date of Latest Interaction) | | | |
| 4616 | (3, 05/02/2015) | (2, 14/10/2014) | | ... |
| 12412 | | (0, -) | | ... |
| 5349 | | | ... | ... |
| .... | | | | |

FIG. 6

Public Company Profile

| Metric Data | | |
|---|---|---|
| Metric Group | Metric | Metric Value |
| Sector | Macro Sector<br>Mid Sector<br>Micro Sector | Technology<br>High Tech-Hardware<br>Semiconductors |
| Market Capitalisation | MCap | $2-3bil |
| Valuation | P/E<br>Dividend Yield | 18-12<br>>2% |

Interaction History

| Investment Manager Contact ID | No. of Interactions | Most Recent Interaction |
|---|---|---|
| 9644 | 5 | 23/03/2015 |
| 347 | 2 | 26/02/2015 |
| 8962 | 1 | 19/07/2014 |
| 5720 | 4 | 07/09/2014 |
| 9240 | 2 | 05/05/2014 |
| 1954 | 2 | 08/10/2014 |
| 1690 | 1 | 08/02/2015 |
| 9465 | 5 | 29/09/2014 |
| 9737 | 5 | 16/03/2015 |
| 1954 | 2 | 22/07/2014 |

FIG. 9

Investment Manager Contact Profiles

Investment Manager Contact Interaction History

| Metric Group | Metric | | Metric Value | Latest Interaction 19/08/2014 | 07/02/2015 | 07/05/2014 | 02/03/2015 | 28/03/2015 |
|---|---|---|---|---|---|---|---|---|
| | | | | Company 1 | Company 2 | Company 3 | Company 4 | Company 5 |
| Geographical | Global Region | | U.S./Canada | ✓ | ✓ | ✓ | ✓ | |
| | | | Europe | | | | | ✓ |
| | | | Asia Pacific | | | | | |
| | | | Rest of World | | | | | |
| Market Capitalisation | MCap | | Small-Cap | | ✓ | | | |
| | | | Mid-Cap | ✓ | | | | |
| | | | Large-Cap | | | ✓ | ✓ | |
| | | | Mega-Cap | | | | | ✓ |
| Valuation | P/E | | <18 | ✓ | ✓ | ✓ | ✓ | |
| | | | 18-22 | | | | | ✓ |
| | | | >22 | | | | | |
| | Dividend Yield | | Non-Paying | | | | | |
| | | | <2% | ✓ | ✓ | ✓ | | |
| | | | >2% | | | | ✓ | ✓ |
| Growth | EPS Growth | | <1% | ✓ | ✓ | | ✓ | |
| | | | 1-10% | | | ✓ | | ✓ |
| | | | >10% | | | | | |
| | Revenue Growth | | <1% | ✓ | ✓ | ✓ | ✓ | ✓ |
| | | | 1-10% | | | | | |
| | | | >10% | | | | | |

Investment Manager Contact Profile

| Metric Group | Metric | Metric Value | % of Interactions | Latest Interaction |
|---|---|---|---|---|
| Geographical | Global Region | U.S./Canada | 60% | 02/03/2015 |
| | | Europe | 40% | 28/03/2015 |
| | | Asia Pacific | 0% | - |
| | | Rest of World | 0% | - |
| Market Capitalisation | MCap | Small-Cap | 20% | 07/02/2015 |
| | | Mid-Cap | 20% | 19/08/2014 |
| | | Large-Cap | 40% | 02/03/2015 |
| | | Mega-Cap | 20% | 28/03/2015 |
| Valuation | P/E | <18 | 80% | 02/03/2015 |
| | | 18-22 | 20% | 28/03/2015 |
| | | >22 | 0% | - |
| | Dividend Yield | Non-Paying | 0% | - |
| | | <2% | 60% | 02/03/2015 |
| | | >2% | 40% | 28/03/2015 |
| Growth | EPS Growth | <1% | 60% | 28/03/2015 |
| | | 1-10% | 40% | 02/03/2015 |
| | | >10% | 0% | - |
| | Revenue Growth | <1% | 100% | 28/03/2015 |
| | | 1-10% | 0% | - |
| | | >10% | 0% | - |

COMPUTER-IMPLEMENTED SYSTEMS AND METHODS FOR INTELLIGENTLY RETRIEVING, ANALYZING, AND SYNTHESIZING DATA FROM DATABASES

This application is a continuation of U.S. patent application Ser. No. 17/354,043, filed Jun. 22, 2021, which is a continuation of U.S. patent application Ser. No. 15/234,311, filed Aug. 11, 2016 (now U.S. Pat. No. 11,048,739), which claims priority to U.S. provisional application 62/205,115, filed Aug. 14, 2015, the entire contents of each of which are incorporated herein by reference.

TECHNICAL OVERVIEW

The technology herein relates to computer-implemented retrieval, analysis, and synthesis of data from multiple databases.

INTRODUCTION

Traditional methods of organizing large amounts of data and determining actions are inefficient. When large amounts of different types and sources of data are accessed, it is difficult to make sense of and use that data in a meaningful way. Correlations between different types of data items can be very valuable and are sometimes referred to as complementary data items. The large data amounts and different data sources and data types makes finding correlations between complementary data items much like trying to find and match complementary needles in different haystacks. Matching complementary data items is particularly difficult if the data items are seemingly unrelated. Another problem is that data item matches in traditional database systems are often incompatible and result in actions that are unproductive. Given a large number of variables and huge amounts of data, the problem is how to efficiently and effectively identify compatible and productive matches between complementary data items in databases.

SUMMARY

Example embodiments include a computer system having one or more data processors and one or more memories including one or more interaction analytics databases. The system automatically extracts from one or more initial databases electronic contact data records associated with multiple contacts. Each electronic contact data record has one or more multiple fields that includes a computer-readable contact identifier for one of the contacts, corresponding computer-readable group identifier for each group which with the contact has had one or more interactions, and computer-readable interaction information that indicates a number of interactions and a timing of at least a most recent interaction between the contact and each group which with the contact has had one or more interactions. The computer system automatically processes the electronic contact data records to generate an electronic contact profile data record for each contact using information from the electronic contact data records. Each contact profile data record includes multiple metric values and a corresponding value for each metric value based on an interaction history of groups that the contact has interacted with. A set of the electronic contact profile data records is stored in one or more interaction analytics databases in electronically addressable and searchable form. The computer system automatically generates electronic group profile data records for multiple groups. Each electronic group profile data record includes metric values associated with the group and an interaction history including information related to interactions between the group and contacts. The computer system automatically compares the electronic profile data records with at least thousands (more likely to be at least tens or hundreds of thousands in commercial implementations) of the electronic contact profile data records to calculate corresponding group-contact compatibility factors and generates a compatibility parameter, for each of at least thousands of contacts based on the corresponding group-contact compatibility parameters. The compatibility parameters generated for the one group are communicated to a computer device associated with the one group.

In certain example implementations, the comparing includes calculating a direct comparison compatibility factor from the electronic group profile data records and the electronic contact profile data records. The computer system automatically calculates an overall similarity parameter between each pair of electronic contact profile data records stored in the one or more interaction analytics databases, there being at least millions of calculated overall similarity parameters. Interaction histories from the electronic group profile data records are compared with the overall similarity parameters to determine an activity derived compatibility factor.

In certain example implementations, calculating the overall similarity parameter for each pair of electronic contact profile data records includes automatically determining similarities between metric values associated with each pair of electronic contact profile data records for multiple metrics. A weighted average may be automatically calculated based on the determined similarities to generate the overall similarity parameter for the pair of electronic contact profile data records.

In certain example implementations, the weighted average includes a time gap weighting factor based on how far apart in time two contacts corresponding to the pair of electronic contact profile data records interacted with a group in a same metric value.

In certain example implementations, a confidence factor is calculated for the overall similarity parameter.

In certain example implementations, the group-contact compatibility factors are automatically calculated based on corresponding activity derived compatibility factors and direct comparison compatibility factors. The activity derived compatibility factors are weighted more heavily than the direct comparison compatibility factors when calculating the group-contact compatibility factors.

In certain example implementations, the activity derived compatibility factor is automatically calculated as follows:

$$C(\text{Company, New Contact}) = \frac{1}{m}\sum_i S(\text{Contact } i, \text{New Contact}) * T_i$$

where C is the activity derived compatibility factor, m is the number of interaction contacts, i is an index, S is the overall similarity parameter, and T is a time weighting.

In certain example implementations, the direct comparison compatibility factor is automatically calculated as follows:

$$J(C, P) = \frac{\sum_i \min(C_i, P_i)}{\sum_i \max(C_i, P_i)} \text{ and } D = \frac{\sum_i w_i * J_i}{\sum_i w_i}$$

where J(C,P) is a Weighted Jaccard index, vectors C and P correspond to the profiles for a particular metric group for contact C and particular group P, D is the direct comparison compatibility factor, $J_i$ is the similarity score for metric set i, and $w_i$ is selected weight for metric set i.

In certain example implementations, a metric is an attribute of a group. Group metric data for each group is stored in the one or more interaction analytics databases using a hierarchical company metric data structure having multiple metric sets, each metric set having one or more metrics, and each metric having one or more metric values. Metric sets in example embodiments include geographical, sector, valuation, market capitalization, growth, finance fundamentals, market data, corporate governance, social responsibility, and/or brand. Example group valuation metric sets includes a price to earnings ratio metric and a dividend yield metric, and wherein the sector metric group includes a macro sector metric, a mid sector metric, and a micro sector metric.

In certain example implementations, the interaction history in each electronic group profile data record includes for each of multiple contact identifiers a number of interactions between the group and contact and a date of a most recent interaction from that number of interactions.

In certain example implementations, each group metric value is a percentage of interactions.

In certain example implementations, the interaction history of companies that the contact has interacted with includes an indication of which if any metric values apply to each of those groups.

The features described herein may be combined to form additional embodiments, and sub-elements of certain embodiments may form yet further embodiments.

This Summary is provided merely for purposes of summarizing some example embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 6 shows a non-limiting example of data aggregation for contact interactions;

FIG. 9 is an example data structure for an example group profile;

FIG. 10 is an example data structure for an example contact profile;

DETAILED DESCRIPTION

Figure 1:
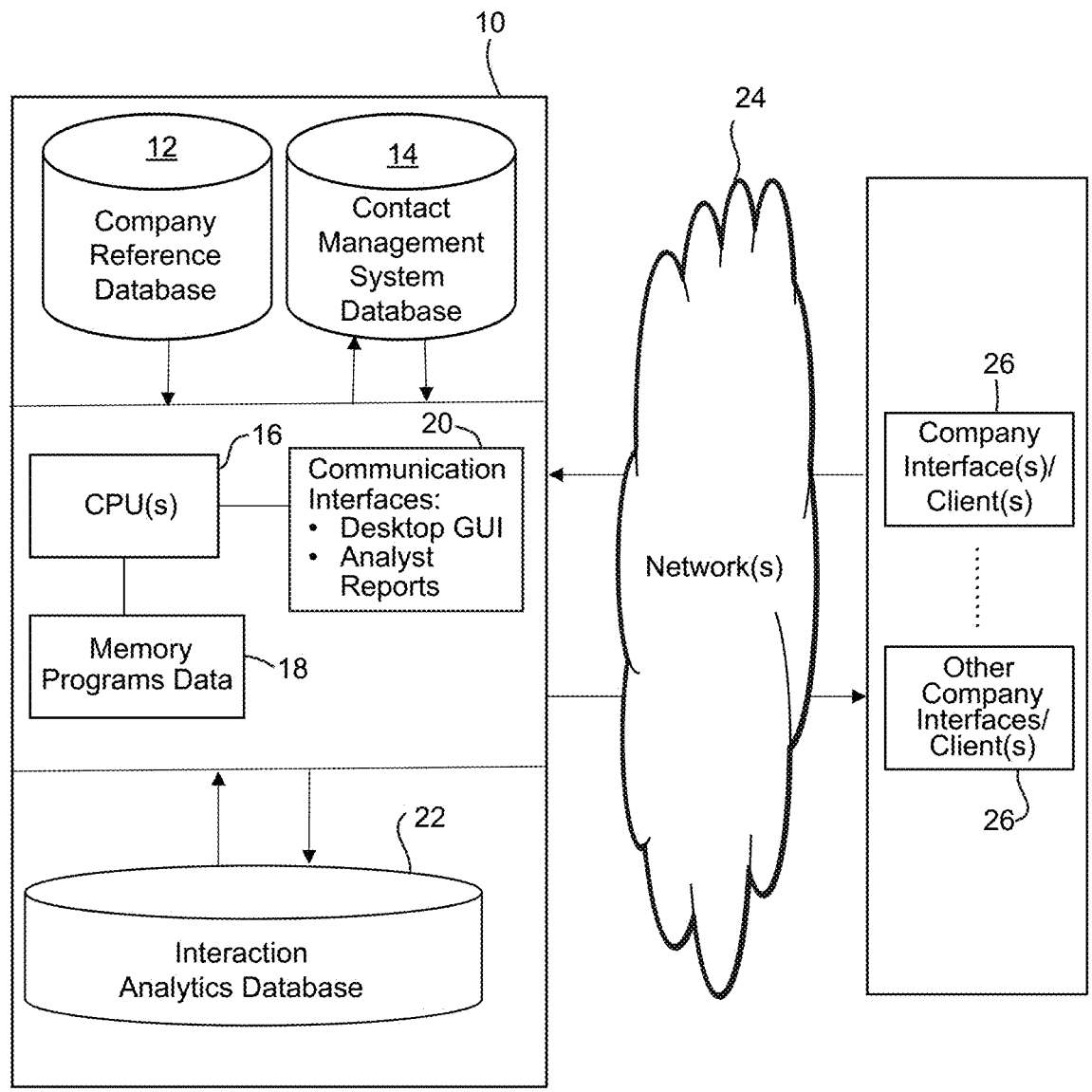
FIG. 1 illustrates a non-limiting example function block diagram of a computer-based system for identifying compatible contacts for groups.

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

OVERVIEW

As explained in the introduction, there are many problems with retrieving, analyzing, and synthesizing of complementary data from multiple databases because there are often so many variables and huge amounts of information involved. One example problem is how to efficiently and effectively identify a compatible and desirable match of investor contact and a particular company where both the investor contact and the company have a high likelihood of desiring and being satisfied with the match. This is an example of desirable match of different but complementary types of information. Companies may identify investor institutions that are desirable to target based on the overall firm's behavior, but due to the size and complexity of larger institutional investors, they may not understand which individual or group of individuals within that organization to prioritize. In these cases, the company's goal is to ensure that it is maximizing its audience within the institution and that it identifies the most compatible individuals that are most likely to invest.

The technological solution focuses on an individual contact level, rather than at a much larger group level (e.g., a company or assets), and specifically uses group-to-contact (e.g., company-to-investor) contact interactions as a key factor in formulating compatibility. A computing system extracts and analyzes group-to-contact interaction data and group (e.g., company) metrics to determine compatibility between a group and potential contacts and identifies the most compatible contacts with which the group should engage. This technology produces prioritized and productive use of resources. In the investor contact-company desiring investment example used as a detailed non-limiting embodiment in the description below, time, efforts, and other resources may be allocated to set up and conduct productive investment-related communications with compatible investor contacts. Of course, the technology may be used in other embodiments, contexts, and applications where determining compatible matching of complementary data items is advantageous.

In the example embodiments below, an example group is a company, and the term "company" includes but is not limited to traditional businesses both public and private, investment banks, venture capital firms, private equity firms, non-governmental organizations, and charities. For purposes of the example embodiments described below, a company refers to a publically-traded company.

The term "metric" is an attribute of a group, e.g., a company. Example metrics include financial, business, and geographic.

An example contact is an "investment contact" who is an individual person that is interested in investing companies. For example, such an individual might work at institutional investment firms, financial funds like mutual funds and hedge funds, venture capital firms, private equity firms, pension funds, sovereign wealth managers, insurance companies, investment advisors, foundations, endowments, investment bank asset managers, bank management division, and individual investors. In the investment embodiment, an example investment contact is an investment manager.

An "interaction" is a person-to-person communication involving a contact, e.g., an investment, and a group, e.g., a company. A typical but non-limiting example interaction involves some sort of face-to-face meeting with an investment contact.

It should be understood that whenever this document describes that a software module or the like performs an action, the action is in actuality performed by underlying hardware elements (such as a processor and a memory device) according to the instructions that comprise the software module.

Description of FIG. 1

FIG. 1 illustrates a non-limiting example function block diagram of a computer-based system 10 for identifying compatible contacts (in this example investment contacts) for groups (in this example companies) 26 seeking investment from investment contacts. The system 10 includes a company reference database 12 storing various types of information about different companies and contact management system database 14 storing information about interactions, e.g., face-to-face meetings, involving an investment contact. The system 10 also includes one or more central processing units (CPUs) 16, memory 18 for storing computer programs and data used in the execution of computer programs, communication interfaces 20 for communicating via one or more data communication networks 24 with company (client) device interfaces 26. The CPUs 16 may comprise one or more digital and/or analog circuit components (e.g., a microprocessor, microcontroller, application-specific integrated circuit, circuit board, etc.) configured as one or more computing systems, such as a server computer (e.g., web server) or other computing system. Client devices include computer devices that include processing circuits, memory, network cards, etc. configured to communicate with the CPUs 16 the network 24. The network 24 may be a local area network, wide area network (e.g., the Internet, an intranet, etc.), personal area network, comprising one or more networks of a wired and/or wireless nature (e.g., wireless cellular phone/data network, etc.); the network may operate according to numerous formats, standards or protocols, such as Ethernet (or IEEE 802.3), SAP, ATP, Bluetooth, and TCP/IP, TDMA, CDMA, 3G, etc. The client devices 26 may comprise personal computers, table computers, smartphones, terminals, etc. Non-limiting interfaces include desktop graphics user interfaces (GUIs). The CPUs 16 communicate with an interaction analytics database 22 that stores interaction metric data determined from information extracted from the company reference database 12 and the contact management system database 14. The CPUs execute one or more computer programs to process information from the interaction analytics database 22 to determine company-investor contact compatibility based on interaction data.

Figures 2, 3:
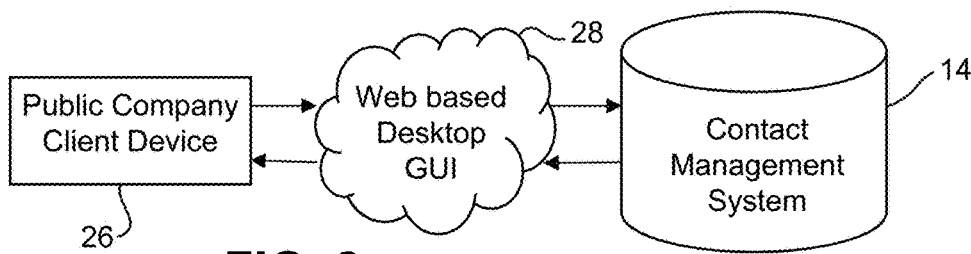
FIG. 2 illustrates a high level view of a group client device interacting with a contact management database system via a web-based desktop GUI.
FIG. 3 is an example screenshot for a user to input individual contact meeting information into the contact management database system.

Description of FIG. 2

A business entity, e.g., NASDAQ, offers its clients (e.g., public companies) a Contact Management System (CMS) 14. FIG. 2 illustrates a high level view of a public company client device interacting with a contact management database system via a web-based desktop GUI. Specifically, public company client devices are used to enter interaction, e.g., meeting, information into the Contact Management System Database 14.

Description of FIG. 3

FIG. 3 is an example screenshot of a GUI for a user to input interaction information (e.g., individual contact meeting information) into the contact management database system 14 including interaction information such as an event title, an interaction type, e.g., a one-on-one meeting, an interaction venue and address/location, start and end times/dates, corporate participants, topics relevant to the interaction, meeting notes, and features to add new contacts. The contact management database system 14 provides a history of interactions between public companies and external parties, some of whom are investment contacts.

The data in the contact management database system 14 is stored in a format such that every electronic contact data record represents an interaction between a public company and an individual person from an external party along with corresponding interaction data regarding the environment of the interaction and the external people involved. For example, a meeting that occurs between a public company and three people from a single external party results in three separate electronic contact data records in the database. Preferably, the contact management database system 14 is a global database so that the electronic contact data records span interactions between public companies and individuals from external parties located all over the globe in all industry sectors.

The electronic public company reference data records stored in the company reference database 12 includes various reference and market data as well as financial, governance, and social responsibility metrics regarding public companies. This data is typically publicly available and/or may be obtained from external vendors.

Figure 4:
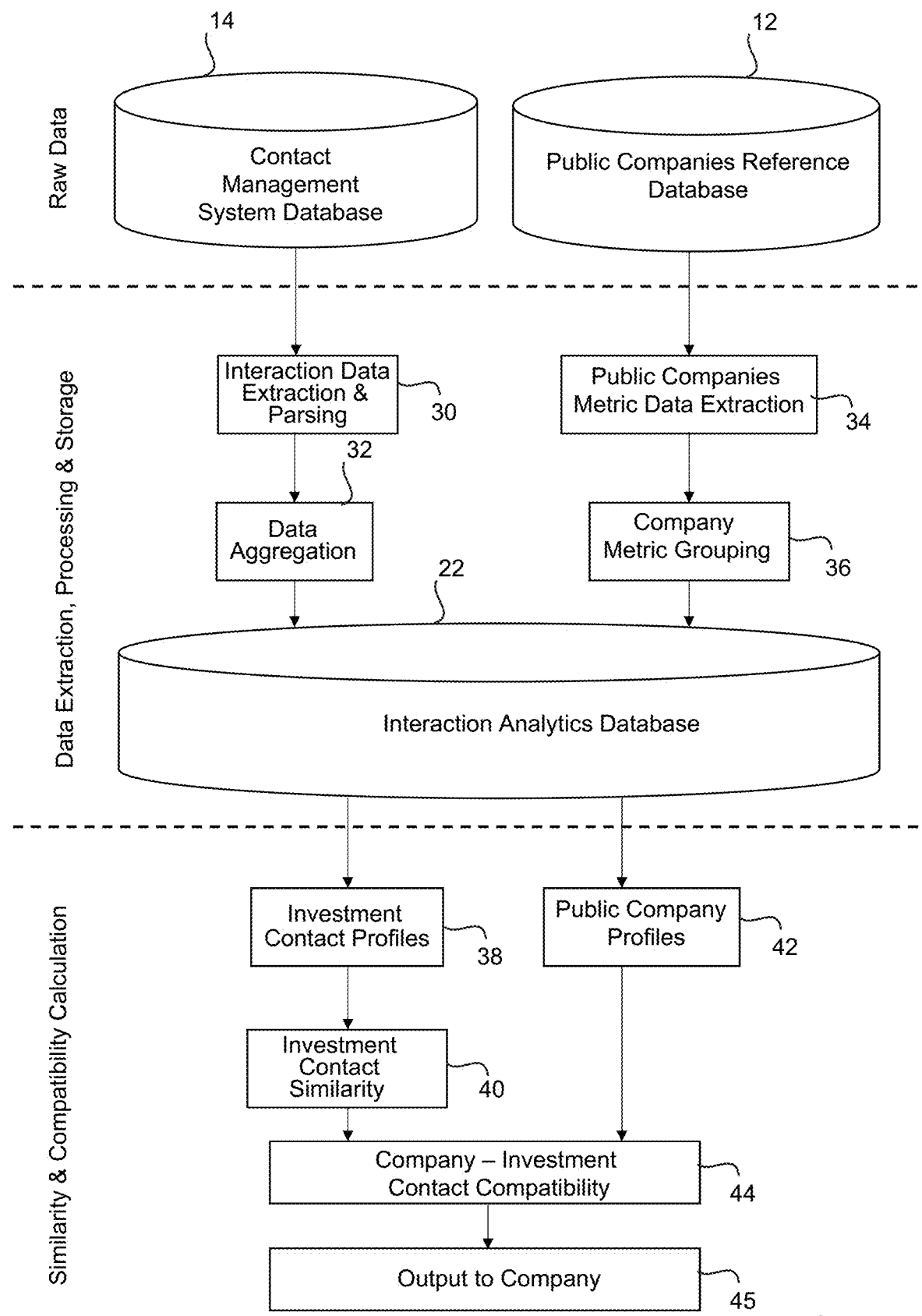
FIG. 4 is function block diagram that illustrates example processes and data structures used to determine group-contact based compatibility according to example embodiments.

Description of FIG. 4

FIG. 4 is function block diagram that illustrates example processes and data structures used to determine company-investment contact compatibility according to example embodiments. The flow begins with the collection and storage of "raw" electronic data records in the company reference database 12 and the contact management database system 14. The flow continues to a data extraction, processing, and storage stage that includes extracting and parsing 30 interaction information from the contact management database system 14 followed by data aggregation 32 of the extracted and parsed interaction information and storage in the interaction analytics database 22. Similarly, electronic public company metric data is extracted 34 from the company reference database 12, grouped 36, and then stored in the interaction analytics database 22. A third stage performs similarity and compatibility calculations. Electronic investment contact profile data records 38 and electronic company profile data records are formulated from the interaction analytics database 22. Investment contact similarity calculations 40 are performed for the electronic investor contact profile data records for each pair of investment contacts in the interaction analytics database 22. Then, a compatibility determination 44 is determined between electronic company profile data records and electronic investment contact profile data records. The compatibility determination is output 45 to the company in any suitable form, e.g., a prioritized list of investment contacts ordered by their compatibility along with optional additional information regarding investment interests and/or investor characteristics. Each of the processes 30, 32, 34, 36, 38, 40, 42, 44, and 45 are described in further detail below. The extraction and use of all database information is done with appropriate permission and with confidentiality and privacy safeguards.

Figure 5:
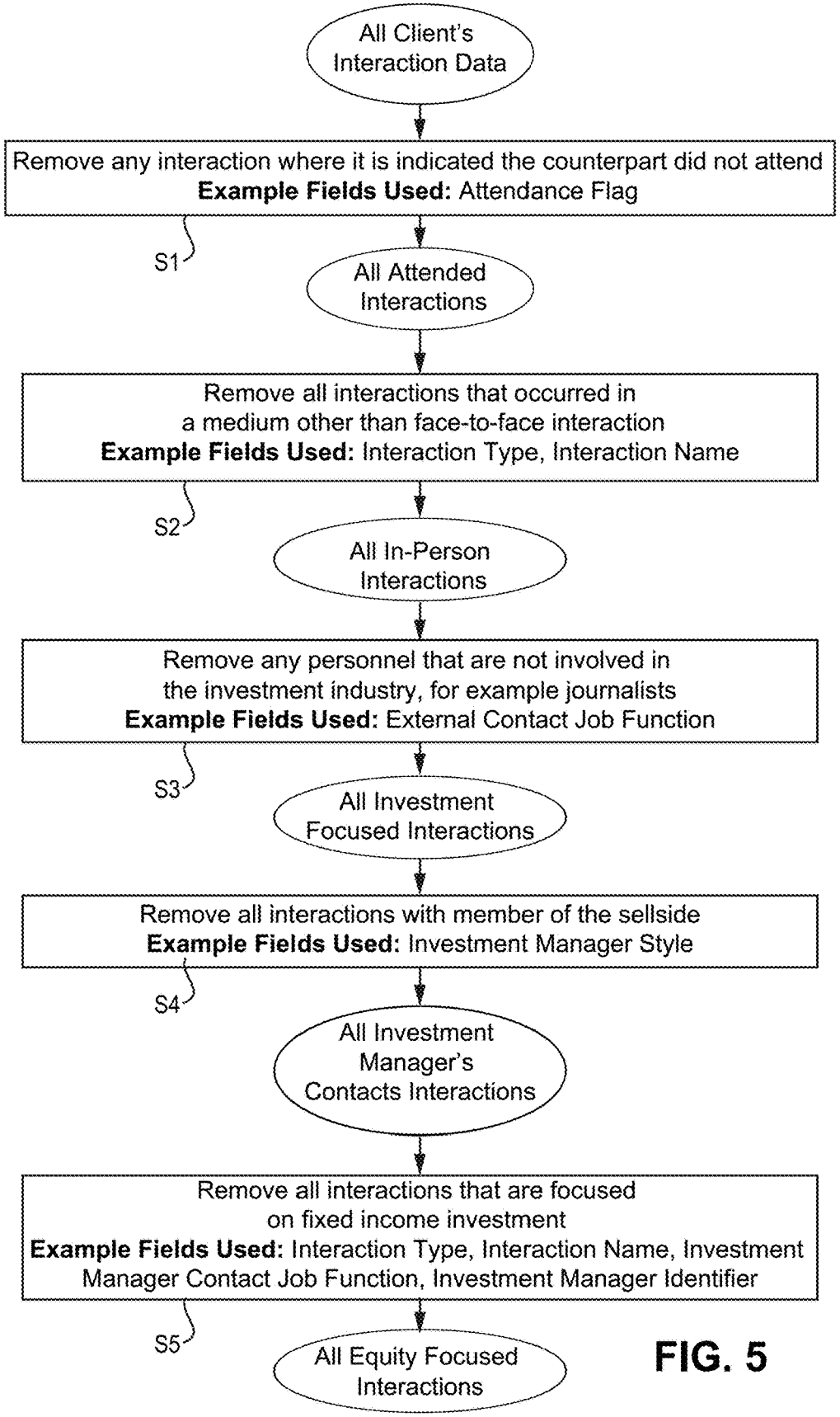
FIG. 5 is a flowchart diagram illustrating example computer-implemented procedures for extracting and parsing contact interaction data in accordance with example embodiments.

Description of FIG. 5

FIG. 5 is a flowchart diagram illustrating example computer-implemented procedures for extracting and parsing individual contact interaction information in accordance with example embodiments. For data extraction, the following fields are examples of data that may be extracted from the contact management database system 14: company identifier, interaction date, interaction name, interaction type, external contact identifier, external contact job function, attendance flag, investment contact identifier, and/or investment contact style. These fields are used to parse the data and create a dataset of electronic contact data records that includes all interactions between public companies and investment contacts, such as but not limited to buy side analysts and investment/portfolio managers. In following examples, only face-to-face interactions are of interest. But it will be appreciated that other types of interactions between individual people may be extracted such as video or web-based interactions.

In step S1, all interactions that did not actually take place as scheduled are removed. These are identified as electronic database records with an example attendance flag data field in an electronic contact data record set as "non-attendance." In step S2, all interactions that occurred in a medium other than face-to-face interaction are removed by a computer-implemented (via CPU(s) 16) extractor and parser by filtering out any records where the interaction type or interaction name data field in a contact data record contains the string "mail," "call," or "webcast." This produces a data set of all in-person interactions undertaken by the public companies. Again, the extraction process can be redefined as method of communications evolve, e.g., webcasts may become a more dominant medium in the future.

In the next step S3, the computer-implemented extractor and parser isolates interactions with investment contacts, which in this example are referred to as investment managers. First, any people that are not involved in the investment industry are removed, for example, journalists and marketing personnel, using an example external contact job function data field in a contact data record.

Step S4 removes all people that work on the sell side. This includes people who work in the investment industry but do not invest in public companies. In this example, this is implemented by the computer-implemented extractor and parser removing electronic contact data records that have an example investment manager style data field in an electronic contact data record set as "broker-dealer."

The computer-implemented extractor and parser in step S5 removes any engagements with venture capitalist and private equity personnel using an example investment manager style data field in an electronic contact data record as these interactions are not related to the trading of the company's public shares, which is a criteria for this non-limiting example.

Another criteria for this non-limiting example is equity investment. Thus, step S6 removes investment manager contact that focus on investment in debt. All electronic contact data records where the word "fixed" appears in an example interaction type, interaction name, or external contact job function fields are removed by the computer-implemented extractor and parser. Removing fixed income investors leaves a dataset of face-to-face interactions between global public companies and equity investment contacts.

Description of FIG. 6

FIG. 6 shows a non-limiting example of data aggregation for investment contact interactions. An example of tabular, parsed interaction information produced at the completion of the computer-implemented extraction and parsing process of FIG. 5 is shown at the top of FIG. 6 and includes for each of four interactions the following example electronic data record fields: a company identifier, an interaction name, an interaction type, a date, an investment manager contact identifier, an investment manager contact job function, an attendance flag, an investment manager identifier, and an investment manager style. This parsed electronic data field data is then condensed and aggregated by a computer-implemented aggregator (via CPU(s) 16) into an interaction information matrix where each entry includes a number of interactions and a date of the most recent interaction for a particular investment manager contact identifier and a particular company identifier in the dataset. The interaction information matrix is then stored in the interaction analytics database 22. This tabular data format is more efficient for subsequent processing and analysis and provides a comprehensive interaction history between all the public companies and all the investment manager contacts.

Electronic investment contact profile data records, which are described below, use a range of metrics to describe the type of public company the investment contact has interacted with. This range of metrics preferably describes various types of public companies and various investment styles of investment contacts.

Figure 7:
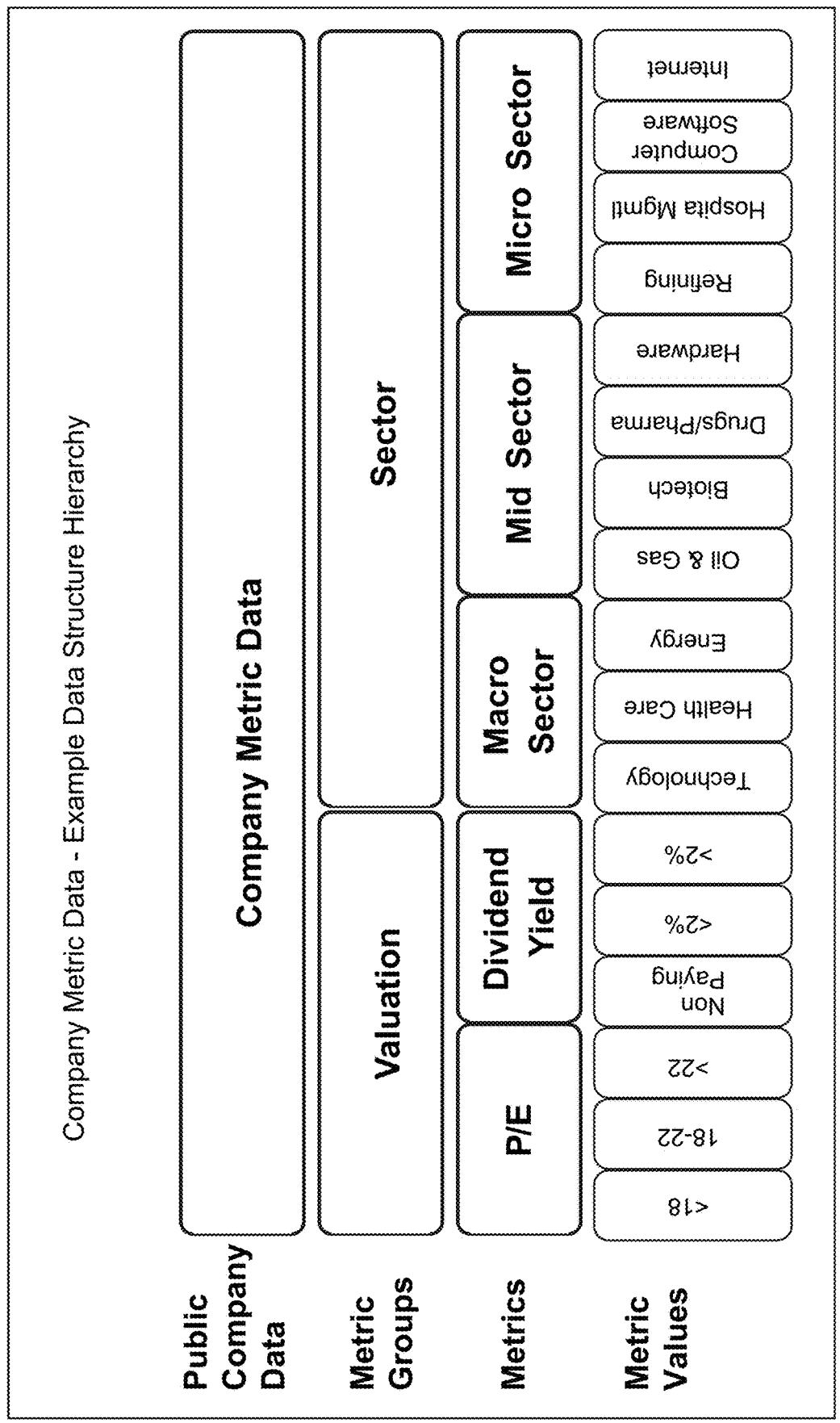
FIG. 7 is an example data structure hierarchy for group metric data.

Description of FIG. 7

FIG. 7 is an example data structure hierarchy for company metric data extracted the CPU(s) 16 (see function block 34) from the public companies reference database 12 that includes public company data. That company data is grouped by the CPU(s) 16 (see function block 36) in metric groups that describe an aspect or attribute of a public company, like valuation and sector. The valuation metric group includes, for example, Price/Earnings (P/E) ratio and dividend yield metrics, and the sector metric group includes, for example, macro sector, mid sector, and micro sector metrics. Each metric then has one or more values or range of values. P/E includes three example metric values: <18, 18-22, and >22. Dividend yield includes three example metric values: non-paying, <2%, and >2%. Macro metric sector includes three example metric values: technology, health care, and energy. Mid metric sector includes four example metric values: oil & gas, biotech, drugs/pharma, hardware. Micro metric sector includes four example metric values: refining, hospital management, computer software, and internet.

Other example metric groups and metrics include:

| Metric Group | Example Metrics |
|---|---|
| Geographical | Country, Global Region |
| Market Capitalization | MCap |
| Growth | EPS Growth, Revenue Growth |
| Finance Fundamentals | Gross Margins, CAPEX-to-Sales, OPEX-to-Sales |
| Market Data | Stock Price |
| Corporate Governance | Board, Pay, Ownership and Control, Accounting |
| Social Responsibility | Nasdaq SRI Classifications |
| Company Brand | Brand Index |

Figure 8:
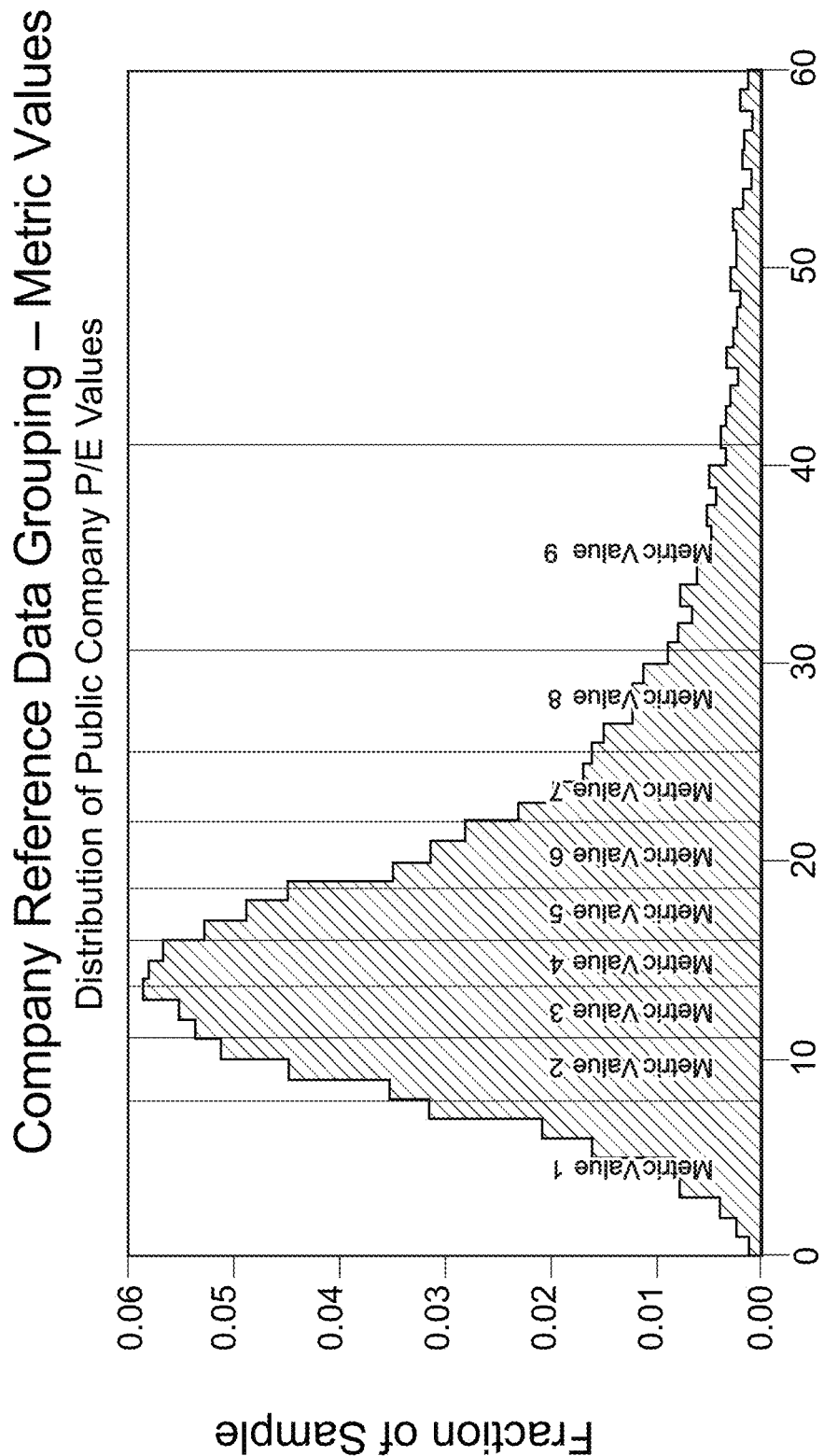
FIG. 8 is a graph illustrating an example of group reference data grouping for a particular group metric (P/E)

Description of FIG. 8

For each metric, all the public companies are grouped into corresponding metric values. The metric values for a particular metric are derived from studying the global distribution of the values and are designed such that individual public company can only sit in a single metric value bin. For example, FIG. 8 is a graph illustrating an example of the grouping companies under certain metric value bins for P/E. All the companies with a P/E metric value of 0-8 are assigned a first metric value. All the companies with a P/E metric value of 8-11 are assigned a second metric value. All the companies with a P/E metric value of 11-13 are assigned a third metric value and so forth up to a P/E metric value of 31-41.

Ultimately, a full grid of metric values are used to generate both investment contact profiles and public company profiles which are stored in the interaction analytics database 22. The grid of groups, metrics, and values is designed to describe different possible investment strategies undertaken by the investment contacts.

Description of FIG. 9

FIG. 9 is an example data structure for an electronic public company profile data record 42 determined from the parsed and aggregated contact data set which are stored in the interaction analytics database 22. In this example, there are two parts to each electronic company profile data record: metric values and interaction history. The first part of the electronic company profile data record 42 includes (1) metric data, which in this example includes metric groups of sector, market capitalization, and valuation, (2) metrics, which in this example includes metrics of macro sector, mid sector, micro sector, MCap, and (3) valuation, which in this example includes P/E and dividend yield. Each metric has a corresponding metric value that describes the metric value for this company. The second part of the electronic public company profile data record 42 is a condensed version of the company's interaction history created by CPU(s) 16 from the company reference database 12 including a list of investment manager contact identifiers the company has interacted with, the number of interactions with each contact, and the date of the most recent interaction with each contact.

Description of FIG. 10

Three pieces of information are used to create an electronic investment contact profile data record for an investment manager contact: an interaction history of the contact, data structure hierarchy for company metric data and the public companies profiles for the public companies in the contacts interaction history. FIG. 10 is an example data structure for an electronic investment contact profile data record 38.

An example investment contact's interaction history is also shown on the left side of FIG. 10. To extract the investment contact's interaction history, the corresponding column from the interaction matrix stored in the interaction analytics database 22 is selected by CPU(s) 16, and only the rows that have at least one interaction with the public company are selected (five public companies are shown in this example). For the companies (identified with company identifiers) that have interacted with the investment contact, their metric values are extracted from the interaction analytics database 22. These are illustrated by ticks in the left-hand side of FIG. 10.

To create the electronic investment contact profile data record 38, the extracted metrics data are used to calculate the fraction of an investment contact's interactions spent with companies with each metric value, for each metric, across all metric groups. An example of this can be seen in the right-hand side of FIG. 10 where 3 of the 5 interactions were with companies from the U.S./Canada region. As a result, the U.S./Canada metric value within the investment contact profile has a profile value of 60%. Along with a profile value, each metric value is assigned with a date of the most recent interaction the investment contact had with a company which has that metric value.

The next processing stage is for CPU(s) 16 to determine a similarity 40 between each pair of investment contact profiles. Having a similarity rating between all pairs of electronic investment contact profile data records allows efficient calculation of compatibility between all companies and all investment contacts using the interaction histories of the companies.

Figure 11:
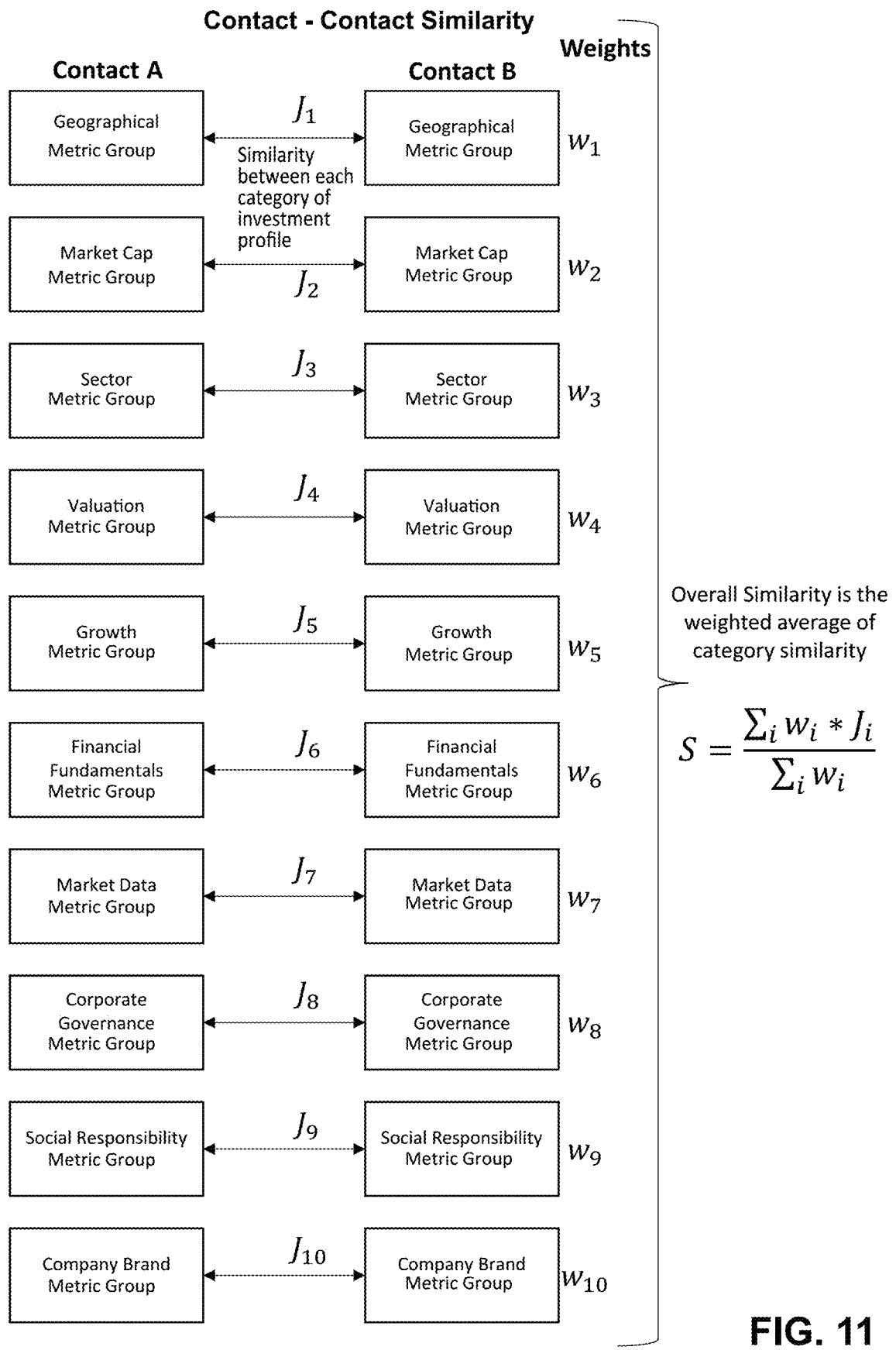
FIG. 11 shows an example for calculating a similarity between two contact profiles.

Description of FIG. 11

FIG. 11 shows example operations used by CPU(s) 16 to calculate a similarity between two individual electronic investment contact profile data records A and B. To calculate the similarity for a single metric group of the profile data records between two investment manager contacts, the example shown in FIG. 11 uses a Weighted Jaccard Index which is defined as follows:

$$J(A, B) = \frac{\sum_i \min(A_i, B_i)}{\sum_i \max(A_i, B_i)}$$

The Weighted Jaccard Index defines the similarity between two vectors of equal magnitude, $A=(A_1, A_2, \ldots, A_n)$ and $B=(B_1, B_2, \ldots, B_n)$, as the ratio of the sum of the all the minimum values and maximum values for each element. So here vectors A and B correspond to the profiles for a particular metric group for investment contact A profile data record and investment contact B profile data record. For example, for the geographical metric, $A_1$ and $B_1$ correspond to the metric value U.S./Canada, $A_2$ and $B_2$ correspond to the metric value Europe, and so forth. This Weighted Jaccard Index calculation can be thought of as a weighted version of the ratio of the interaction and union of two sets of the vectors A and B.

As individual investment strategies evolve and change over time as the economic landscape changes, it is preferable to ensure that the investment manager contacts who are interacting with the same type of companies at the same time are given the highest similarity scores. This may be accomplished, for example, by the CPU(s) 16 implementing a rule that the smaller the gap in time between two investment manager contacts interacting with the same type of public company the stronger the indicator of similarity. This rule is incorporated in the calculation by using a Time Gap Weighting, G, which down-weights the part of the similarity scores contributed by a given metric value based on how far apart in time the two investment manager contacts A and B last interacted with a company that resides in that metric value. The weighting function may take the following form.

$$G(d_A, d_B, u, l) = \begin{cases} 0, & \min(N_A, N_B) = 0 \\ 1, & \min(N_A, N_B) > 0, |d_A - d_B| < 91 \text{ days} \\ \dfrac{(l-u)(|d_A - d_B| - 91)}{273} + u, & (\min(N_A, N_B) > 0, |d_A - d_B| \geq 91 \text{ days} \end{cases}$$

where $d_A$ and $d_B$ are the dates that investment manager contacts A and B last interacted with public companies in the same metric value, u and l are the minimum and maximum weights, and $N_A$ and $N_B$ are the percentage of interactions for investment manager contacts A and B, respectively, spent with companies that have that specific metric value. As the minimum percentage of interactions for a metric value that only one of the investment manager contacts has interacted with is 0, setting the Time Gap Weight to zero for these characteristics does not affect the calculation.

This modified Jaccard Weighted Index is defined as:

$$J(A, B) = \frac{\sum_i \min(A_i, B_i) * G_i}{\sum_i \max(A_i, B_i)}$$

where $G_i$ is the Time Gap Weighting for each metric value.

The final similarity score is calculated as the weighted mean of the individual metric group similarity scores $$S = \frac{\sum_i w_i * J_i}{\sum_i w_i}$$

where $J_i$ is the similarity score for metric group i and $w_i$ is the optimally chosen weight for metric group i.

The similarity scores $J_i$ for every pair of contacts are stored in the interaction analytics database 22. There is likely to be a large number of similarity scores $J_i$.

For each similarity score S between two investment manager contacts, it may be desirable to also indicate a confidence in the score based on the amount of underlying data for each contact. The higher the number of companies that an investment manager contact actually interacts with, the higher the confidence. The confidence of a similarity score between investment manager contact i and investment manager contact j is defined as the function F(S).

$$F(S(C_A, C_B)) = \min\left(1, \frac{\min(n_A, n_B)}{k}\right)$$

where $n_A$ and $n_B$ are the number of different public companies interacted with by investment manager contacts A and B, and k is a threshold that defines as a lower confidence. As a non-limiting example, k may be 15 different companies.

Figure 12:
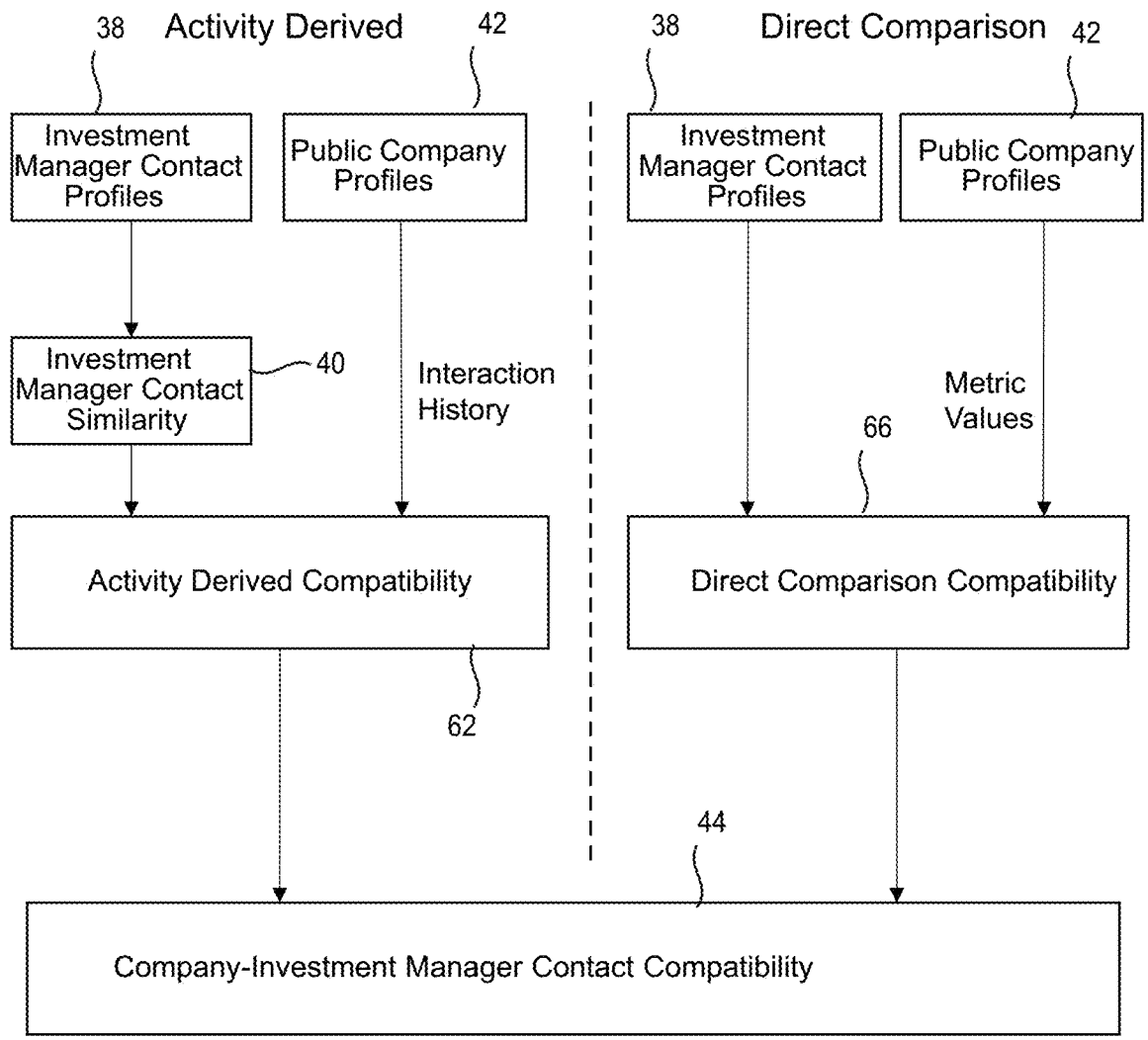
FIG. 12 is a flowchart diagram showing example, computer-implemented procedures for calculating a compatibility between a group and a contact.

Description of FIG. 12

FIG. 12 is a flowchart diagram showing example, computer-implemented procedures for calculating a compatibility between an electronic company profile data record and an electronic investment manager contact profile data record. Two different compatibilities are calculated and then combined to give a final compatibility score. The two different paths use the two different parts of the electronic company profile data record to calculate the compatibility with the investment contacts. The flow shown on the left-hand side of FIG. 12 depicts the calculation of Activity Derived Compatibility 62. This calculation uses the interaction history of the public companies and the investment manager contact similarities scores 40. The calculation of Activity Derived Compatibility 62 effectively determines how similar each investment contact is to those that the company has previously interacted with. The Direct Comparison flow shown in the right-hand side of FIG. 12 is where a Direct Comparison Compatibility score is calculated between the electronic company profile data record and the electronic investment manager contact profile data records using the metric values associated with the company. This is a direct comparison between the metric values in the electronic company profile data record 42 and the electronic investment contact profile data record 38. The activity derived compatibility score 62 and the direct comparison compatibility score 66 are used to calculate a final company-investment contact compatibility 44.

Figure 13:
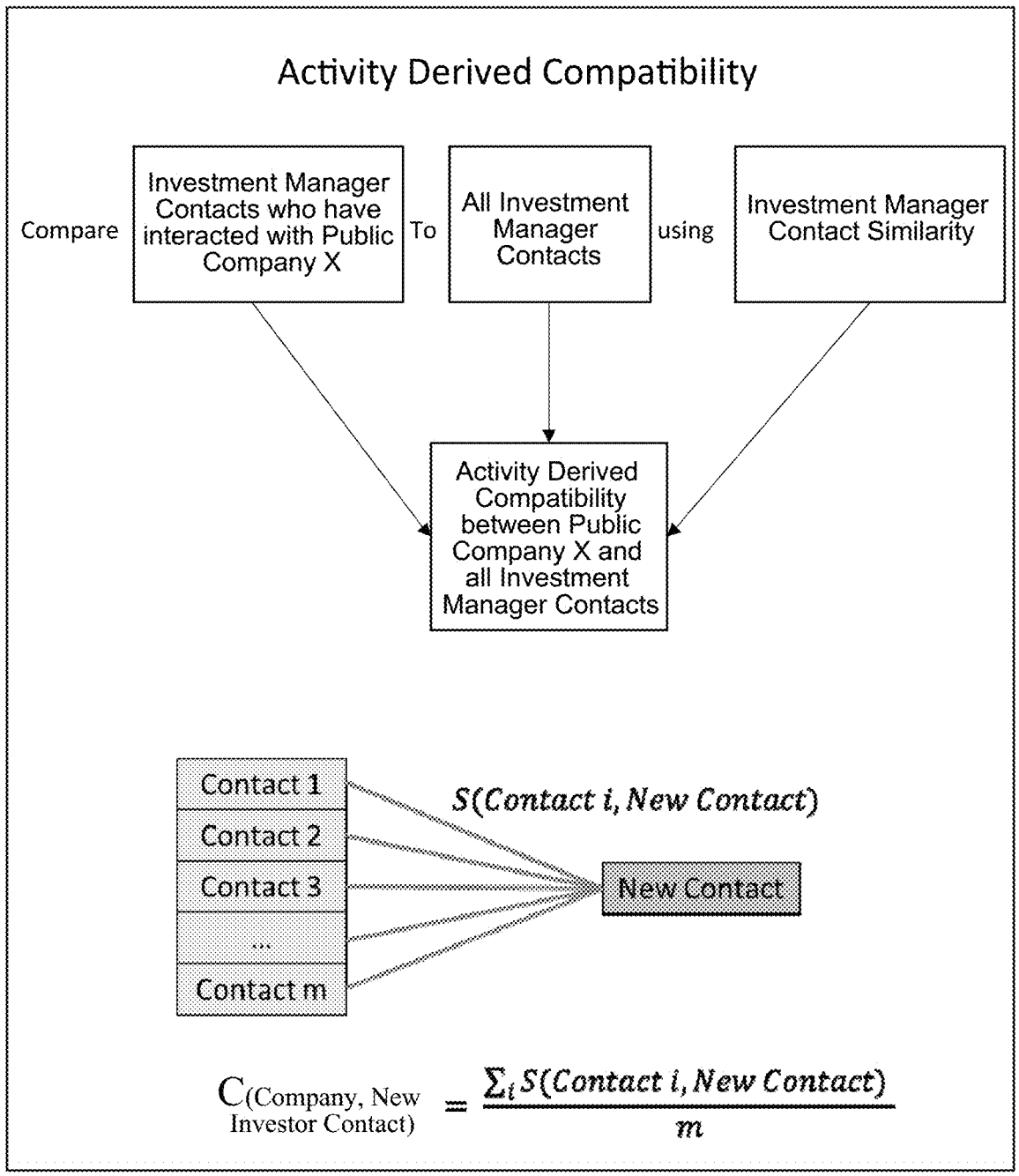
FIG. 13 is a diagram that shows a specific example to calculate an activity derived compatibility factor between a group and a contact.

Description of FIG. 13

FIG. 13 is a diagram that shows a specific example to calculate an Activity Derived Compatibility between a company and an investment manager contact. More specifically, the Activity Derived Compatibility reflects how a public company's interaction history can be used along with the investment manager contact similarities to calculate a compatibility for each public company and each investment manager contact.

For a calculation, for a single public company, the CPU(s) 16 generate a list of all the investment manager contacts who have interacted with that public company, shown as contact 1, 2, 3, . . . , m. The compatibility between the public company and a particular investment contact is the average of the similarities scores S between the investment contact in question and all the investment manager contacts the company has interacted with over a previous analysis period, 1, 2, 3, . . . , m.

If the public company has met m contacts, then the Activity Derived Compatibility C with a new investment manager contact or an investment manager contact the public company has already interacted with is:

$$C(\text{Company, New Contact}) = \frac{1}{m}\sum_i S(\text{Contact } i, \text{ New Contact})$$

As a public company changes over time, the investment manager contacts the public company has interacted with most recently preferably carry more weight within the compatibility calculation than those interacted with at the start of the analysis period. To implement this preference, a Lookback Weight, T, is applied to each similarity score within the compatibility calculation. These weights may be defined by the following function:

$$T(d, u, l) = \begin{cases} 1, & \text{if } d < 91 \text{ days} \\ \dfrac{(l-u)*d}{273} + \dfrac{(4u-1)}{3}, & \text{else} \end{cases}$$

where d is the number of days since the investment manager contact last interacted with public companies in the same metric value, and u and l are minimum and maximum weights.

The activity derived compatibility C calculation is now expressed as follows:

$$C(\text{Company, New Contact}) = \frac{1}{m} \sum_i S(\text{Contact } i, \text{New Contact}) * T_i$$

As with the similarity score S, it may be valuable to provide a confidence rating for each compatibility calculation score. One way to determine a confidence in the compatibility score is to permeate the confidence score through the compatibility calculation, i.e., for the above calculation, the average of the confidence scores for the similarities score used in the calculation is calculated.

The Direct Comparison Compatibility calculation 66 from FIG. 12 uses the metric values of the companies and compares them to those in the profiles of the investment manager contacts. This can be done, for example, with the same method used for calculating similarity between electronic investment contact profile data records, excluding the Time Gap weighting.

The inputs may be adjusted to suit particular goals. For example, metric values associated with the company may be selected. For example, the macro-sector metric value may be changed from Technology to Technology and Consumer Discretionary. Such metric adjustments may also be used for scenario testing to determine how compatibility changes if, for example, the company increased its dividend. In addition, the relative weighting may be changed between the metric groups of the electronic investment manager contact profile data records to focus on a particular area.

The final compatibility 44 between a public company and an investment manager contact may be calculated as a weighted average of the Activity Driven Compatibility and the Direct Comparison Compatibility. In one example embodiment, the weight of the Activity Driven Compatibility is higher than that of the Direct Comparison Compatibility for situations where it is more beneficial to have the final results driven by the investment contact profiles derived from the full dataset and for the companies to receive personalized outputs based on their own activity rather than simply their high level characteristics.

Example personalized output for company XYZ is shown in the table and include information regarding the contact, along with the overall compatibility score with company XYZ, and a corresponding confidence rating. Each contact's compatibility rank within their investment firm is also included.

| Name | Role | Email | Telephone | Country | City | Firm Name | Comp Score | Conf Score | Firm Rank |
|---|---|---|---|---|---|---|---|---|---|
| Top 5 Most Compatible Investment Contacts for Company XYZ | | | | | | | | | |
| Investment Contact 1 | Security Analyst | xxx@xxxx.com | XXX-XXX-XXXX | United States | New York | Investment Firm 1 | 100.00 | 81% | 1 |
| Investment Contact 2 | Security Analyst | xxx@xxxx.com | XXX-XXX-XXXX | United States | New York | Investment Firm 1 | 97.77 | 53% | 2 |
| Investment Contact 3 | Security Analyst | xxx@xxxx.com | XXX-XXX-XXXX | United States | Boston | Investment Firm 2 | 96.63 | 85% | 1 |
| Investment Contact 4 | Portfolio Manager | xxx@xxxx.com | XXX-XXX-XXXX | United States | New York | Investment Firm 3 | 95.86 | 85% | 1 |
| Investment Contact 5 | Portfolio Manager | xxx@xxxx.com | XXX-XXX-XXXX | United States | New York | Investment Firm 4 | 95.49 | 85% | 1 |
| Compatibility Ordered Contacts for Company XYZ for Investment Firm 99 | | | | | | | | | |
| Investment Contact 9 | Security Analyst | xxx@xxxx.com | XXX-XXX-XXXX | United States | New York | Investment Firm 99 | 88.85 | 85% | 1 |
| Investment Contact 17 | Portfolio Manager | xxx@xxxx.com | XXX-XXX-XXXX | United States | San Francisco | Investment Firm 99 | 85.52 | 85% | 2 |
| Investment Contact 24 | Portfolio Manager | xxx@xxxx.com | XXX-XXX-XXXX | United States | Boston | Investment Firm 99 | 77.28 | 77% | 3 |
| Investment Contact 67 | Portfolio Manager | xxx@xxxx.com | XXX-XXX-XXXX | United States | New York | Investment Firm 99 | 75.32 | 69% | 4 |

Another example embodiment relates to a non-transitory computer-readable medium that includes program instructions for causing a computer to:

- process electronic contact data records associated with multiple investment contacts, each electronic contact data record including: a contact identifier for one of the investment contacts, a corresponding company identifier for each company which with the investment contact has had one or more interactions, and interaction information that indicates a number of interactions and a timing of at least a most recent interaction between the investment contact and each company which with the investment contact has had one or more interactions;
- generate an electronic investment contact profile data record for each investment contact using information from the electronic contact data records, where each investment contact profile data record includes multiple company metric values and a corresponding value for each company metric value based on an interaction history of companies that the investment contact has interacted with;
- store a set of the electronic investment contact profile data records in the one or more interaction analytics databases in electronically addressable and searchable form;
- generate electronic company profile data records for multiple companies, each electronic company profile data record including metric values associated with the company and an interaction history including information related to interactions between the company and investment contacts;
- compare the electronic company profile data records with the electronic investment contact profile data records to calculate corresponding company-investment contact compatibility factors;
- generate a compatibility score which indicates a likelihood that the investment contact would become a potential investor in one of the companies based on the corresponding company-investment contact compatibility factors; and
- communicate to a computer device associated with the one company the compatibility scores generated for the one company.

In the description above, for purposes of explanation and not for limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Several of the block diagrams include or refer to computing devices (also as CPU(s), computer system, computing system, computers, processors, etc.). In some embodiments, a computing device includes one or more of the following: one or more processors; one or more memory devices; one or more network interface devices; one or more display interfaces; and one or more user input adapters. Additionally, in some embodiments, the computing device is connected to or includes a display device. These elements (e.g., the processors, memory devices, network interface devices, display interfaces, user input adapters, display device) are hardware devices (for example, electronic circuits or combinations of circuits) that are configured to perform various different functions for the computing device.

In some embodiments, each or any of the processors is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors uses an instruction set architecture such as x86 or Advanced RISC Machine (ARM).

In some embodiments, each or any of the memory devices is or includes, a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors). Memory devices are examples of non-volatile computer-readable storage media. Memory devices are used to store data in databases and access to these data is provided by one or more database management systems (DBMSs) including integrated computer software that allows interaction with one or more databases and provides access to the data contained in the database. The DBMS provides various functions that allow entry, storage and retrieval of large quantities of information and provides ways to manage how that information is organized. Because of the close relationship between them, the term database refers to both a database and the DBMS used to manipulate it.

In some embodiments, each or any of the network interface devices includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the user input adapters is or includes one or more circuits that receive and process user input data from one or more user input devices that are included in, attached to, or otherwise in communication with the computing device, and that output data based on the received input data to the processors. Alternatively or additionally, in some embodiments each or any of the user input adapters is or includes, for example, a PS/2 interface, a USB interface, a touchscreen controller, or the like; and/or the user input adapters facilitates input from user input devices such as, for example, a keyboard, mouse, trackpad, touchscreen, etc.

In some embodiments, the display device may be a Liquid Crystal Display (LCD) display, Light Emitting Diode (LED) display, or other type of display device. In embodiments where the display device is a component of the computing device (e.g., the computing device and the display device are included in a unified housing), the display device may be a touchscreen display or non-touchscreen display. In embodiments where the display device is connected to the computing device (e.g., is external to the computing device and communicates with the computing device via a wire and/or via wireless communication technology), the display device is, for example, an external monitor, projector, television, display screen, etc.

In various embodiments, the computing device includes one, or two, or three, four, or more of each or any of the above-mentioned elements. The computing device may be arranged, in various embodiments, in many different ways. As just one example, the computing device may be arranged such that the processors include: a multi (or single)-core processor; a first network interface device (which implements, for example, WiFi, Bluetooth, NFC, etc. . . . ); a second network interface device that implements one or more cellular communication technologies (e.g., 3G, 4G LTE, CDMA, etc. . . . ); memory or storage devices (e.g., RAM, flash memory, or a hard disk). The processor, the first network interface device, the second network interface device, and the memory devices may be integrated as part of the same SOC (e.g., one integrated circuit chip). As another example, the computing device may be arranged such that: the processors include two, three, four, five, or more multi-core processors; the network interface devices include a first network interface device that implements Ethernet and a second network interface device that implements WiFi and/or Bluetooth; and the memory devices include a RAM and a flash memory or hard disk.

The hardware configurations described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above, (e) via other hardware arrangements, architectures, and configurations, and/or via combinations of the technology described in (a) through (e).

Technical Advantages of Described Subject Matter

In certain example embodiments, the technology described in the application dramatically improves upon the inefficient methods of organizing large amounts of data and determining actions. Even when large amounts of different types and sources of data are accessed, the described technology permits fast correlation and efficient and effective use of complementary data items culled from databases. For example, through the dissemination and analysis of company-investor contact interaction information across the markets and the globe, the technology described above is very different from and a dramatic improvement over existing contact targeting tools that are centered around institutions and assets.

SELECTED TERMINOLOGY

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

Although process steps, algorithms or the like may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
one or more memories that include one or more person-to-person communication analytics databases;
one or more hardware data processors coupled to the one or more memories, the one or more hardware data processors being configured to:
store in the one or more memories (i) electronic contact profile data records and (ii) electronic group profile data records for multiple groups, each electronic group profile data record including computer-readable metric values corresponding to person-to-person communications between the group and human contacts;
automatically process the electronic group profile data records with the electronic contact profile data records to calculate corresponding group-human contact compatibility factors;
automatically determine similarities between metric values corresponding to at least some of the electronic contact profile data records;
automatically calculate a weighted average based on the similarities between metric values corresponding to electronic contact profile data records to generate an overall similarity parameter for electronic contact profile data records, where the weighted average includes a time gap weighting factor based on how far apart in time human contacts corresponding to the electronic contact profile data records communicated with a same group or with different groups having a same metric value;
automatically generate a compatibility parameter for one or more human contacts for at least one of the groups based on the corresponding group-human contact compatibility factors and the overall similarity parameters; and
electronically communicate to one or more computer devices compatibility parameters generated for the at least one of the groups.

2. The computer system in claim 1, wherein the one or more hardware data processors is configured to automatically calculate a confidence factor for the overall similarity parameter.

3. The computer system in claim 1, wherein the one or more data hardware processors is configured to calculate a direct comparison compatibility factor from the electronic contact profile data records and the electronic group profile data records.

4. The computer system in claim 3, wherein the one or more hardware data processors is configured to:
compare person-to-person communication histories from the electronic group profile data records with overall similarity parameters to determine an activity-derived compatibility factor.

5. The computer system in claim 4, wherein the one or more hardware data processors is configured to:
automatically calculate the corresponding group-human contact compatibility factors based on corresponding activity-derived compatibility factors and direct comparison compatibility factors.

6. The computer system in claim 5, wherein the one or more hardware data processors is configured to automatically weight the corresponding activity-derived compatibility factors more heavily than the direct comparison compatibility factors when calculating the corresponding group-human contact compatibility factors.

7. The computer system in claim 4, wherein the one or more hardware data processors is configured to calculate the activity-derived compatibility factor as follows:

$$C(\text{Company, New Contact}) = \frac{1}{m}\sum_i S(\text{Contact } i, \text{ New Contact}) * T_i$$

where C is the activity-derived compatibility factor, m is a number of person-to-person communications, i is an index, S is an overall similarity parameter, and T is a time weighting.

8. The computer system in claim 3, wherein the one or more hardware data processors is configured to automatically calculate the direct comparison compatibility factor using:

$$J(C, P) = \frac{\sum_i \min(C_i, P_i)}{\sum_i \max(C_i, P_i)} \text{ and } D = \frac{\sum_i w_i * J_i}{\sum_i w_i}$$

where J(C,P) is a Weighted Jaccard index, vectors C and P correspond to profile data records for a particular metric set for human contact C and particular group P, D is the direct comparison compatibility factor, $J_i$ is a similarity score for metric set i, and $w_i$ is a selected weight for metric set i.

9. The computer system in claim 1, wherein a metric is an attribute of a group and the one or more hardware data processors is configured to:
store group metric data for each group using a hierarchical group metric data structure having multiple metric set, each metric set having one or more metrics, and each metric having one or more metric values.

10. A method implemented by a computer system including one or more hardware data processors and one or more memories, comprising:
storing, by the computer system, (i) electronic contact profile data records and (ii) electronic group profile data records for multiple groups, each electronic group profile data record including metric values corresponding to person-to-person communications between the group and human contacts;
automatically processing, by the computer system, the electronic group profile data records with the electronic contact profile data records to calculate corresponding group-human contact compatibility factors;
automatically determining, by the computer system, similarities between metric values corresponding to at least some of the electronic contact profile data records;
automatically calculating, by the computer system, a weighted average based on the similarities between metric values corresponding to electronic contact profile data records to generate an overall similarity parameter for electronic contact profile data records, where the weighted average includes a time gap weighting factor based on how far apart in time human contacts corresponding to the electronic contact profile data records communicated with a same group or with different groups having a same metric value;

automatically generating, by the computer system, a compatibility parameter for each human contact for at least one of the groups based on the corresponding group-human contact compatibility factors and overall similarity parameters; and electronically communicating, by the computer system, to one or more computer devices compatibility parameters generated for the at least one of the groups.

11. The method in claim 10, wherein the one or more hardware data processors is configured to automatically calculate a confidence factor for the overall similarity parameter.

12. The method in claim 10, wherein the one or more data hardware processors is configured to calculate a direct comparison compatibility factor from the electronic contact profile data records and the electronic group profile data records.

13. The method in claim 12, wherein the one or more hardware data processors is configured to:
compare person-to-person communication histories from the electronic group profile data records with overall similarity parameters to determine an activity-derived compatibility factor.

14. The method in claim 13, wherein the one or more hardware data processors is configured to automatically calculate the corresponding group-human contact compatibility factors based on corresponding activity-derived compatibility factors and direct comparison compatibility factors.

15. The method in claim 14, wherein the one or more hardware data processors is configured to automatically weight the corresponding activity-derived compatibility factors more heavily than the direct comparison compatibility factors when calculating the corresponding group-human contact compatibility factors.

16. The method in claim 13, wherein the one or more hardware data processors is configured to calculate the activity-derived compatibility factor as follows:

$$C(\text{Company, New Contact}) = \frac{1}{m}\sum_i S(\text{Contact } i, \text{New Contact}) * T_i$$

where C is the activity-derived compatibility factor, m is a number of person-to-person communications, i is an index, S is an overall similarity parameter, and T is a time weighting.

17. The method in claim 12, wherein the one or more hardware data processors is configured to automatically calculate the direct comparison compatibility factor using:

$$J(C, P) = \frac{\sum_i \min(C_i, P_i)}{\sum_i \max(C_i, P_i)} \text{ and } D = \frac{\sum_i w_i * J_i}{\sum_i w_i}$$

where J(C,P) is a Weighted Jaccard index, vectors C and P correspond to profile data records for a particular metric set for human contact C and particular group P, D is the direct comparison compatibility factor, $J_i$ is a similarity score for metric set i, and $w_i$ is a selected weight for metric set i.

18. The method in claim 10, wherein a metric is an attribute of a group and the one or more hardware data processors is configured to:
store group metric data for each group using a hierarchical group metric data structure having multiple metric set, each metric set having one or more metrics, and each metric having one or more metric values.

19. A non-transitory, computer-readable medium including program instructions that, when executed by a computer, cause the computer to:
store (i) electronic contact profile data records and (ii) electronic group profile data records for multiple groups, each electronic group profile data record including metric values corresponding to person-to-person communications between the group and human contacts;
automatically process the electronic group profile data records with the electronic contact profile data records to calculate corresponding group-human contact compatibility factors;
automatically determine similarities between metric values corresponding to at least some of the electronic contact profile data records;
automatically calculate a weighted average based on the similarities between metric values corresponding to electronic contact profile data records to generate an overall similarity parameter for electronic contact profile data records, where the weighted average includes a time gap weighting factor based on how far apart in time human contacts corresponding to the electronic contact profile data records communicated with a same group or with different groups having a same metric value;
automatically generate a compatibility parameter for each human contact for at least one of the groups based on the corresponding group-human contact compatibility factors and overall similarity parameters; and
electronically communicate to one or more computer devices compatibility parameters generated for the at least one of the groups.

* * * * *